United States Patent
Saitoh et al.

(10) Patent No.: US 6,850,258 B2
(45) Date of Patent: Feb. 1, 2005

(54) SCREEN DISPLAY CONTROL METHOD, A SCREEN DISPLAY CONTROL DEVICE THEREFOR, AND A COMPUTER-READABLE RECORDING MEDIUM

(75) Inventors: Fumio Saitoh, Kawasaki (JP); Yukari Itoh, Kawasaki (JP); Takahiro Uchiyama, Nei (JP); Toru Kiura, Nei (JP); Yoshihiro Mizuuchi, Nei (JP); Hideki Shimomura, Nei (JP)

(73) Assignee: Fujitsu Limited, Kawasaki (JP)

( * ) Notice: Subject to any disclaimer, the term of this patent is extended or adjusted under 35 U.S.C. 154(b) by 492 days.

(21) Appl. No.: 09/845,293

(22) Filed: May 1, 2001

(65) Prior Publication Data

US 2001/0028367 A1 Oct. 11, 2001

Related U.S. Application Data

(63) Continuation of application No. PCT/JP99/03033, filed on Jun. 7, 1999.

(30) Foreign Application Priority Data

Nov. 2, 1998 (JP) ........................................... 10-312141

(51) Int. Cl.$^7$ ................................................. G09G 5/00
(52) U.S. Cl. .................. 345/830; 345/819; 345/820; 345/825; 345/828; 345/829; 345/835
(58) Field of Search ................................ 345/819, 820, 345/825, 828, 829, 835, 830, 805, 837, 721, 720, 734, 736, 738, 739, 766, 767

(56) References Cited

U.S. PATENT DOCUMENTS

| | | | |
|---|---|---|---|
| 5,504,863 A | | 4/1996 | Yoshida |
| 5,909,220 A | * | 6/1999 | Sandow .................. 345/589 |
| 6,097,393 A | * | 8/2000 | Prouty et al. ............... 345/419 |
| 6,097,853 A | * | 8/2000 | Gu et al. .................... 382/282 |
| 6,236,398 B1 | | 5/2001 | Kojima et al. |

FOREIGN PATENT DOCUMENTS

| | | |
|---|---|---|
| JP | 4-123225 | 4/1992 |
| JP | 7-221782 | 8/1995 |
| JP | 08-235200 | 9/1996 |
| JP | 9-223092 | 8/1997 |
| JP | 10-187576 | 7/1998 |
| JP | 10-207440 | 8/1998 |
| JP | 10-232757 | 9/1998 |

OTHER PUBLICATIONS

Japanese Office Action mailed Sep. 2, 2003 issued with respect to the basic Japanese patent application No. 10–312141.

* cited by examiner

Primary Examiner—Ba Huynh
Assistant Examiner—Truc Truong Chuong
(74) Attorney, Agent, or Firm—Staas & Halsey LLP (57) ABSTRACT

Icons indicating operating conditions of each of nodes (computers) constituting a system are individually displayed in the form of a loop. When the total number of the nodes exceeds a total number B of individual displays, nodes corresponding to B are displayed individually, and the rest are displayed in the form of a node collective icon. When a forward button is clicked, a display position of each of the node icons revolves clockwise one by one, a node that has been in the node collective icon is displayed individually at a position of a node icon, and an node icon at a position of a node icon is contained in the node collective icon. By clicking buttons a clockwise continuous revolving display, a counterclockwise revolving display and a counterclockwise continuous revolving display are performed. Node icons are highlighted so as to indicate abnormal conditions of the corresponding nodes.

9 Claims, 12 Drawing Sheets

[NODE3 IS ALSO AN ABNORMAL NODE]

| CONTROL NUMBER | NODE NUMBER |
|---|---|
| 1 | NODE 1 |
| 2 | NODE 2 |
| ⋮ | ⋮ |
| X−1 | NODE X−1 |
| X | NODE X |
| N−Y+1 | NODE N−Y+1 |
| ⋮ | ⋮ |
| ⋮ | ⋮ |
| N−1 | NODE N−1 |
| N | NODE N |

INDIVIDUAL DISPLAYS (ON THE RIGHT SIDE OF THE LOOP) — X

INDIVIDUAL DISPLAYS (ON THE LEFT SIDE OF THE LOOP) — Y ($\leq$ D−X)

| CONTROL NUMBER | NODE NUMBER |
|---|---|
| 1 | NODE 1 |
| 2 | NODE 2 |
| ⋮ | ⋮ |
| X−1 | NODE X−1 |
| X | NODE X |
| X+1 | NODE X+1 |
| ⋮ | ⋮ |
| N−Y | NODE N−Y |
| N−Y+1 | NODE N−Y+1 |
| ⋮ | ⋮ |
| ⋮ | ⋮ |
| N−1 | NODE N−1 |
| N | NODE N |

INDIVIDUAL DISPLAYS (ON THE RIGHT SIDE OF THE LOOP) — X

COLLECTIVE ICON — M

INDIVIDUAL DISPLAYS (ON THE LEFT SIDE OF THE LOOP) — Y (=D−X)

FIG.7

| CONTROL NUMBER | NODE NUMBER |
|---|---|
| 1 | NODE 2 |
| 2 | ⋮ |
| ⋮ | NODE X−1 |
| X−1 | NODE X |
| X | NODE X+1 |
| X+1 | ⋮ |
| ⋮ | NODE N−Y |
| N−Y | NODE N−Y+1 |
| N−Y+1 | ⋮ |
| ⋮ | ⋮ |
| ⋮ | NODE N−1 |
| N−1 | NODE N |
| N | NODE 1 |

INDIVIDUAL DISPLAYS (ON THE RIGHT SIDE OF THE LOOP): X

COLLECTIVE ICON: M

INDIVIDUAL DISPLAYS (ON THE LEFT SIDE OF THE LOOP): Y (=D−X)

FIG.8

| CONTROL NUMBER | NODE NUMBER |
|---|---|
| 1 | NODE N |
| 2 | NODE 1 |
| ⋮ | NODE 2 |
| X−1 | ⋮ |
| X | NODE X−1 |
| X+1 | NODE X |
| ⋮ | NODE X+1 |
| N−Y | ⋮ |
| N−Y+1 | NODE N−Y |
| ⋮ | NODE N−Y+1 |
| ⋮ | ⋮ |
| N−1 | ⋮ |
| N | NODE N−1 |

INDIVIDUAL DISPLAYS (ON THE RIGHT SIDE OF THE LOOP) — X

COLLECTIVE ICON — M

INDIVIDUAL DISPLAYS (ON THE LEFT SIDE OF THE LOOP) — Y (=D−X)

SCREEN DISPLAY CONTROL METHOD, A SCREEN DISPLAY CONTROL DEVICE THEREFOR, AND A COMPUTER-READABLE RECORDING MEDIUM

This application is a continuing application filed under 35 U.S.C. §111(a), based upon International Application PCT/JP99/03033, filed Jun. 7, 1999, it being further noted that priority is based upon Japanese Patent Application 10-312141, filed Nov. 2, 1998.

A screen display control method, a screen display control device therefor, and a computer readable recording medium.

1. Technical Field

The present invention relates to a screen display control for individually displaying conditions of each of a multitude of system constituents, for example, conditions (operating conditions, etc.) of a plurality of nodes (computers) and resources thereof constituting a cluster system, in a loop-form on a screen.

In general, even when the number of constituents of a system becomes so large that conditions of all the constituents cannot be individually displayed on one screen, it is preferable that each of the constituents can be displayed on the same screen one by one under a good property of manipulation and a good visibility without using a scrolling method. The present invention responds to such a demand.

2. Background Art

Figure 1:
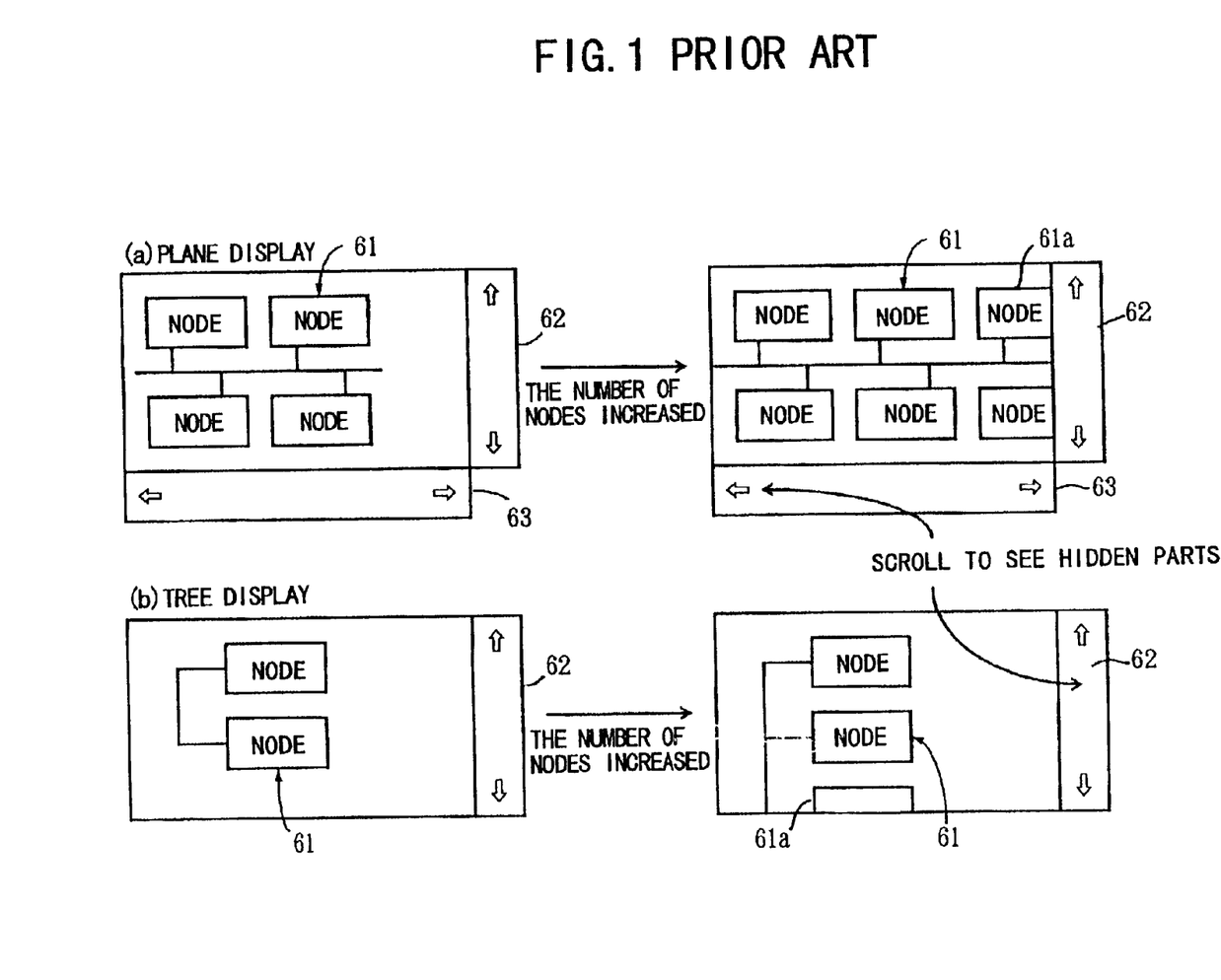
FIG. 1 is an explanatory illustration showing a conventional node display.

FIG. 1 shows an outline of a conventional node display, in which (a) shows a state of a plane display, and (b) shows a state of a tree display.

Here, in a plane display control method, a screen is displayed with node icons 61 connected to each other, the node icons 61 indicating nodes which are constituents of a cluster system, and in a tree display control method, a screen is displayed with showing these node icons 61 as a tree structure.

In a case of these screen display methods, as the number of nodes of a cluster system increases, there occur node icons that keep hiding without being displayed on a screen. Further, there occur node icons 61a having a shape that is divided by an edge portion of a screen.

In order to display on a screen all node icons including the hidden node icons and the node icons 61a not fully displayed, an up/down scroll button 62 and a left/right scroll button 63 have to be manipulated.

As above, with conventional screen display control methods, in a case where the number of constituents (e.g., nodes and resources thereof) of a system is large, all of the constituents cannot be contained in one screen. Additionally, since there also occur constituents that are cut off by an edge portion, visibility is poor. Further, there has been a problem that, even when a constituent not appearing on a screen has an abnormality, it is not noticed unless a screen scroll manipulation is done.

Thereupon, in the present invention, all objects to be displayed of system constituents are divided into an individually displayed group and the remaining collective group not individually displayed, and both are displayed in the form of a loop on a screen. Then, based on an instruction of a revolving display, one, for example, of system constituents corresponding to the collective group is newly displayed individually, and at the same time, one, for example, system constituent that has been displayed individually thitherto is, so to speak, hidden into the collective group. Thereby, it is an object to secure an excellent visibility for all of the constituents even under a condition where the number of system constituents exceeds the total number of individual displays.

In addition, the present invention has it an object to provide a highly convenient image display control method which is easy to manipulate, compared with a scrolling manipulation premised on shifting in two directions of an up/down direction and a left/right direction, by individually displaying all of the constituents by a revolving manipulation in basically one direction.

DISCLOSURE OF INVENTION

The present invention solves the above-mentioned problems as follows.

In a screen display control method for individually displaying conditions of each of a plurality of constituents of a system in a form of a loop on a screen, a total number A (A is a positive integer) of objects to be displayed regarding the said constituents and a total number B (B is a positive integer) of individual displays on the screen are compared so that, when A is greater than B, a collective group indicating that purport is displayed on a part of the said part in the form of the loop, and at the same time each of the said objects to be displayed corresponding to B is individually displayed. Then, based on an instruction of a revolving display, any number of the said objects to be displayed corresponding to the said collective group are newly displayed individually, and at the same time the said number of the said objects to be displayed that have been displayed previously individually are shifted into the said collective group.

According to the present invention, as described above, even in a case where there are so many system constituents that all of the system constituents cannot be individually displayed, conditions of each of the system constituents can surely be displayed on the same fixed screen.

The present invention targets a screen display control method and a screen display control device that have the foregoing function, and a computer-readable program-recording medium storing a program for causing a computer to perform this function.

BEST MODE FOR CARRYING OUT THE INVENTION

Embodiments of the present invention will be described using FIG. 2 to FIG. 12.

It is noted that, for convenience' sake in explanation, the following embodiments are premised on a case of displaying on a screen operating conditions of system constituents, such as nodes and various resources thereof, in a cluster system connected with a plurality of nodes (computers). Additionally, a revolving display unit is one system constituent.

Figure 2:
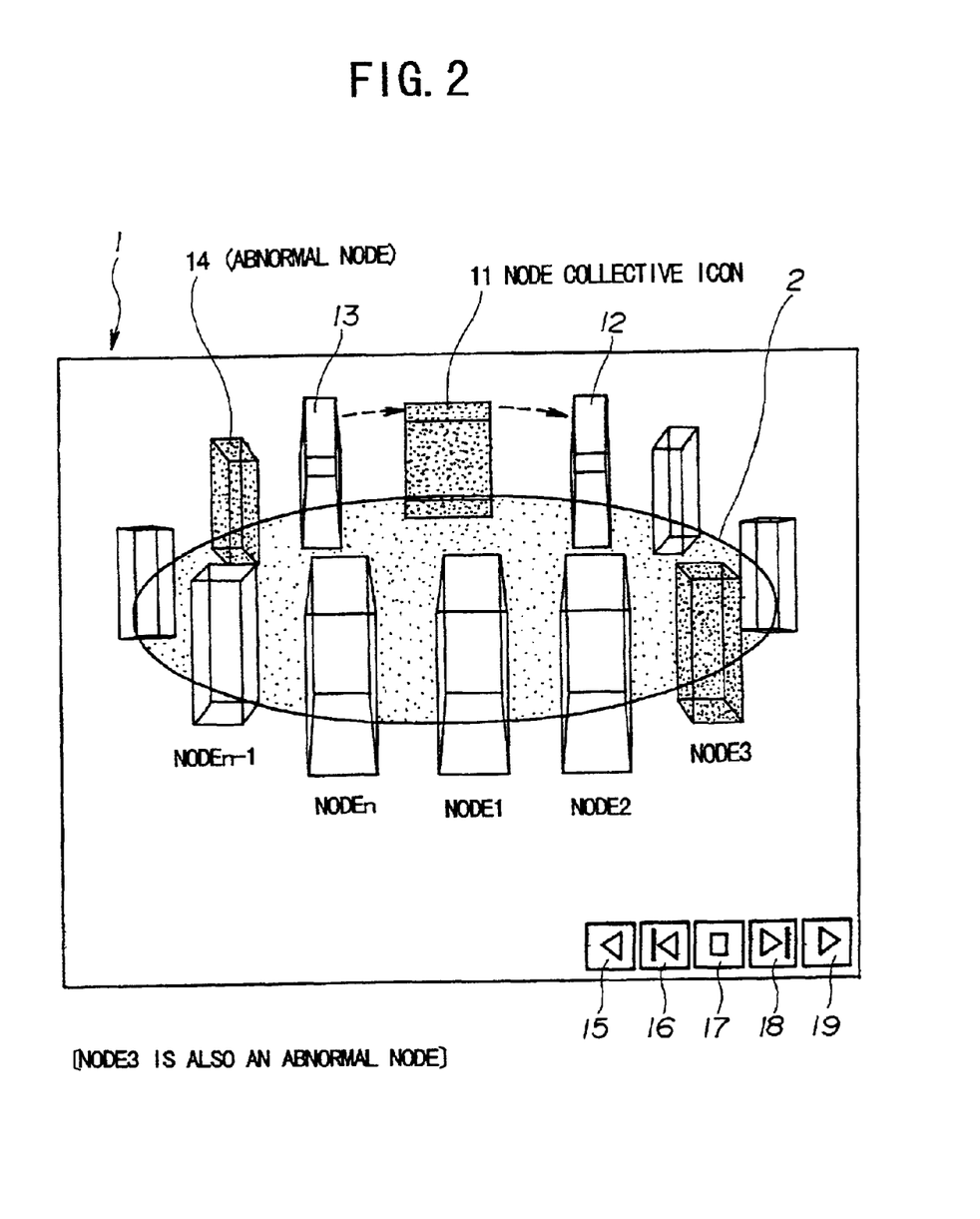
FIG. 2 is an explanatory illustration showing a cluster system display with the number of nodes being n of the present invention.
Figure 3:
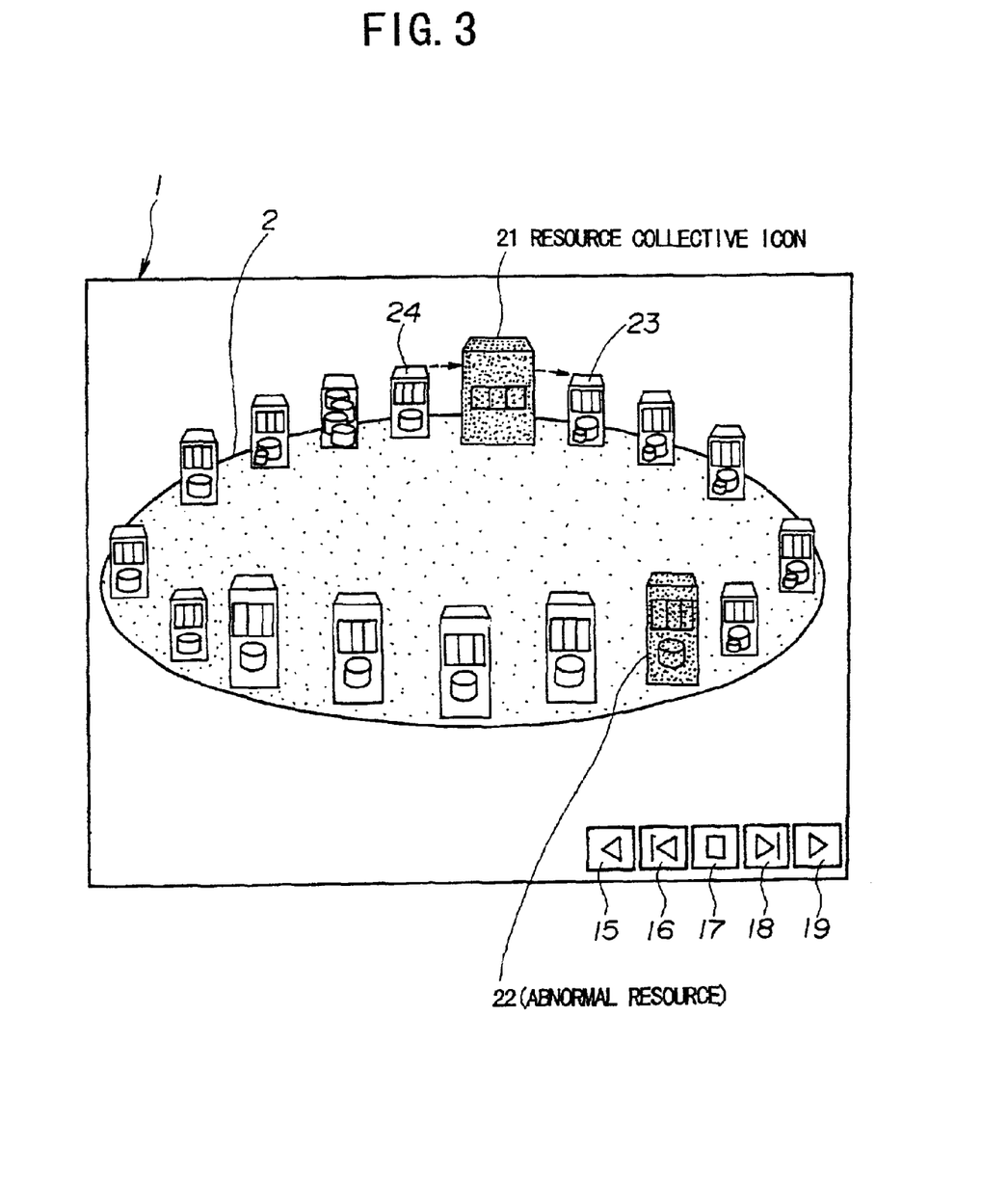
FIG. 3 is an explanatory illustration showing a resource display of an abnormal node (a node 3) of the present invention.

A first embodiment of the present invention will be described using FIG. 2 and FIG. 3. FIG. 2 is an illustration explaining a cluster system display with the number of nodes being n, and FIG. 3 shows a resource display of an abnormal node shown in FIG. 2. In a screen 1 shown in FIG. 2, each of a right-side individual display group from an icon of a node 1 to a node icon 12 a node collective icon 11 and a left-side individual display group from a node icon 13 to an icon of a node n is displayed counterclockwise in sequence along a loop 2 by a three-dimensional graphics.

In each of node icons individually displayed, operation control information indicating the node being normal/abnormal and related information (illustration omitted), such as a name, a type and an installation location of the node, etc.

are displayed. In a case shown in FIG. 2, an icon of a node 3 and a node icon 14 are highlighted so as to indicate that each of the nodes corresponding to these icons is in an abnormal condition.

Additionally, in the node collective icon 11, information summarizing each of nodes not individually displayed, for example, a total number of the said nodes whether an abnormal node is present among the said nodes and a total number of the said abnormal nodes, etc.

is displayed. In the case shown in FIG. 2, a part of the node collective icon 11 is highlighted so as to indicate that an abnormal node is present among the nodes not individually displayed.

On the screen in FIG. 2, when buttons 15, 16, 18 and 19 for a revolving display are clicked by a mouse, display positions theretofore of the node icons revolve.

When clicking the forward button 16, the node icon 14 moves to a position of the node icon 13, and the node icon 13 enters the node collective icon 11, ceasing to be an object of an individual display. Also, an individually displayed node icon moves clockwise to a position of the neighboring node icon, and one of the nodes being theretofore in the node collective icon 11 is individually displayed as a new node icon at a position of the node icon 12 on the right of the node collective icon 11.

When clicking the continuous direction button 15, the above-mentioned clockwise revolution of a node icon display is conducted, for example, every one second, and the said revolution is terminated by a clicking manipulation of a stop button 17.

Additionally, when clicking the reverse button 18, a node icon on the right of the node icon 12 moves to the position of the node icon 12, and the node icon 12 enters the node collective icon 11, ceasing to be an object of an individual display. Also, an individually displayed node icon moves counterclockwise to a position of the neighboring node icon, and one of the nodes being theretofore in the node collective icon 11 is individually displayed as a new node icon at the position of the node icon 13 on the left of the node collective icon 11.

When clicking the continuous direction button 19, as when clicking the continuous direction button 15, a display position of each of the node icons revolves counterclockwise, for example, every one second, until the stop button 17 is clicked.

FIG. 3 is a screen displayed after clicking the node icon of the node 3 on the screen shown in FIG. 2, in which operating conditions of each of resources, such as memories and disks, constituting the node 3 are displayed in the same form of expression as FIG. 2.

In each of resource icons individually displayed, operation control information indicating the resource being normal/abnormal, and related information (illustration omitted), such as a name, a type and a capacity of the resource, etc., are displayed. In a case shown in FIG. 3, a resource icon 22 is highlighted so as to indicate that a resource condition corresponding to this is abnormal.

Additionally, in a resource collective icon 21, information summarizing each of nodes not individually displayed, for example, a total number of the said resources whether an abnormal resource is present among the said resources and a total number of the said abnormal resources, etc.

is displayed. In the case shown in FIG. 3, a part of the resource collective icon 21 is highlighted so as to indicate that an abnormal resource is present among the resources not individually displayed.

Additionally, functions of a continuous forward button 15, a forward button 16, a reverse button 18, a continuous reverse button 19 and a stop button 17 of FIG. 3 are the same as the case shown in FIG. 2.

That is, when clicking the continuous forward button 15 or the forward button 16, each of the resource icons on a screen 1 revolves clockwise one by one, and a resource icon which is, so to speak, contained theretofore in the resource collective icon 21 is newly displayed individually at a position of an icon 23.

When clicking the reverse button 18 or the continuous reverse button 19, each of the resource icons on the screen 1 revolves counterclockwise one by one, and a resource icon contained theretofore in the resource collective icon 21 is newly displayed individually at a position of an icon 24.

When clicking the continuous forward button 15 or the continuous reverse button 19, this clockwise or counter-clockwise revolving move continues, for example, every one second, until the stop button 17 is clicked.

Additionally, each of the icons on the screen 1 in FIG. 2 or FIG. 3, can be moved to any position on the screen by manipulating the mouse.

Figure 4:
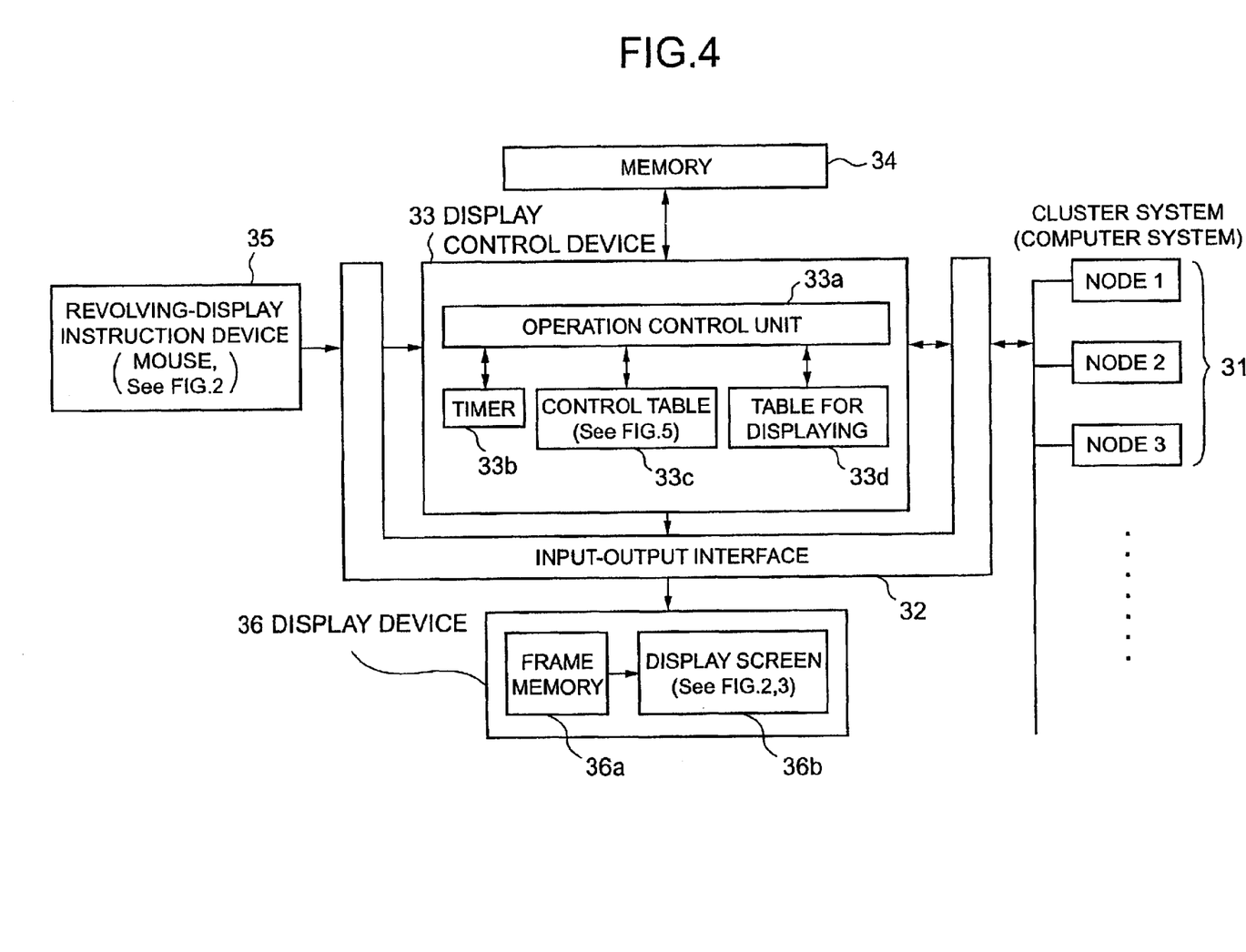
FIG. 4 is an explanatory illustration showing an example of a system configuration of the present invention.

FIG. 4 shows an example of a system configuration of the present invention. The present system is constituted mainly by a display control device 33, a memory 34, a display device 36 connected by an input-output interface 32, a revolving display device 35 such as a mouse, and a node group (a computer group) 31 which is a constituent of a cluster system connected by a LAN (local area network). Additionally, the display control device 33 is constituted by an operation control unit 33a, a timer 33b, a control table 33c, and a table 33d for displaying. The display device 36 is constituted by a frame memory 36a and a display screen 36b. The operation control unit 33a of the display control device 33 executes the icon displays shown in FIG. 2 and FIG. 3 on the display screen 36b, in brief, by operations hereinbelow described.

Regularly receiving individual operation data (node data and resource data, etc.) from each of the nodes 31 of the cluster system via the input-output interface 32, and storing the data in the memory 34 in the form of a hierarchical structure.

Retaining relations between each of the nodes (or each of resources) to be displayed on the screen and a control number (a display position number) in the control table 33c.

Retaining the node data of each of the nodes (or the resource data of each of resources) to be displayed on the screen in the table 33d for displaying.

Generating bit data for displaying icons based on contents of the control table 33c and the table 33d for displaying, and storing this in the frame memory 36a of the display device 36.

FIG. 5 to FIG. 8 show contents of the control table. N indicates a total number of nodes, D indicates a total number of individual displays, X indicates a number of individual displays on the right side of the loop, Y indicates a number of individual displays on the left side of the loop, and M (=N−D) indicates a number of nodes corresponding to the collective icon.

Figure 5:
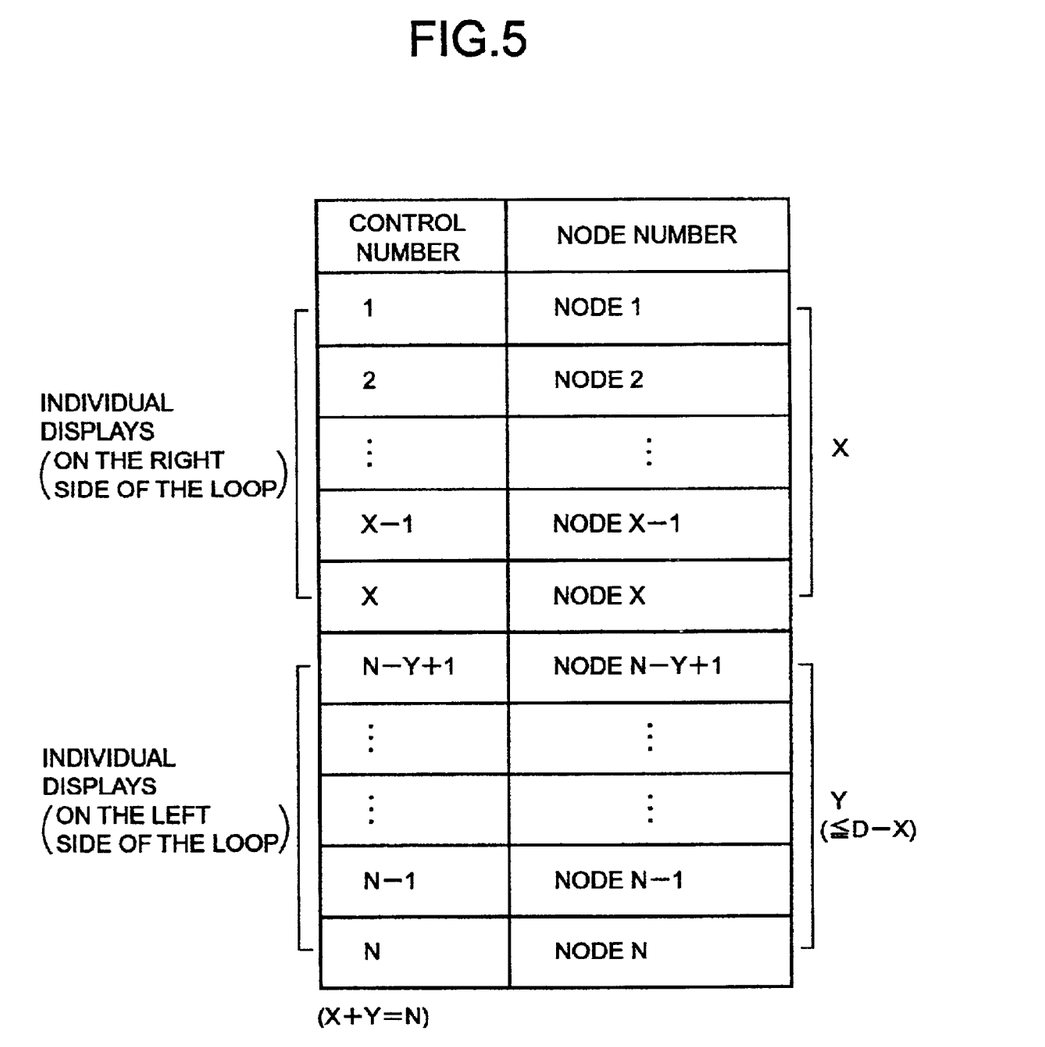
FIG. 5 is an explanatory illustration showing a control table (in a case where there is no collective icon) of the present invention.
Figure 6:
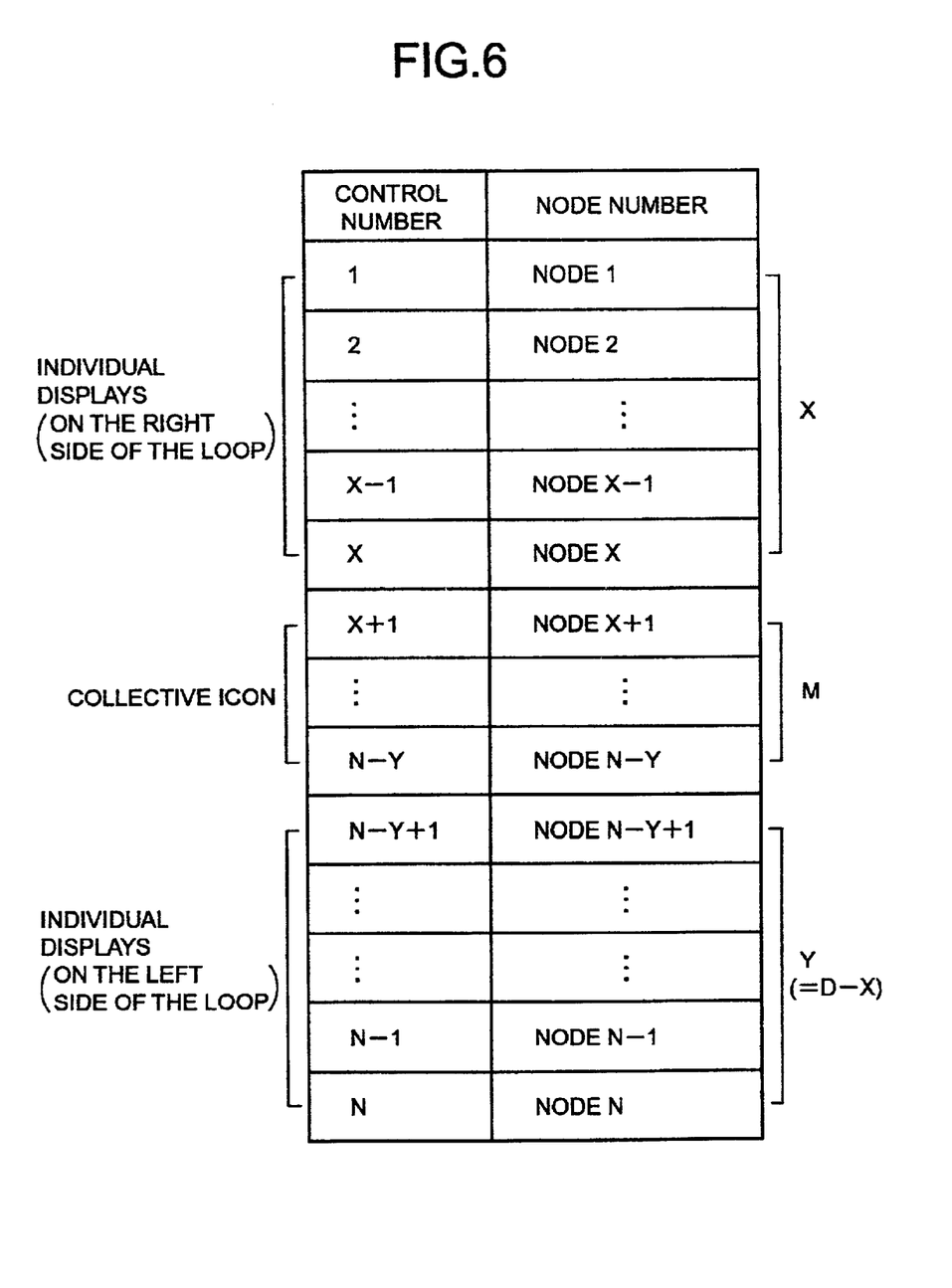
FIG. 6 is an explanatory illustration showing the control table (in a case where there is a collective icon) of the present invention.

The contents of the control table in FIG. 5 and FIG. 6 are of initial conditions, and each of the node 1 to the node N is given the control number in the order of 1, 2, ... N−1, N. This control number is also a display position number of each of the icons in the loop 2 shown in FIG. 2 and FIG. 3.

The control table shown in FIG. 5 corresponds to a case where all of the operating conditions of each of the nodes in the cluster system are individually displayed on the screen in the form of node icons without a collective icon.

The control table shown in FIG. 6 is a case where the relation between the total number N of nodes and the total number D of individual displays is "N>D", in which each of the nodes of the control numbers from (X+1) to (N−Y) is displayed as a collective icon.

The control table shown in FIG. 7 corresponds to a case where the forward button 16 or the continuous forward button 15 is clicked, in which each of node numbers has an increment of "+1" except a part of the control number N, compared with the case of FIG. 6, as the relations between the control numbers and the nodes are as follows:

the node 2 to the control number 1 the node (X+1) to the control number X the node N to the control number (N−1)

the node 1 to the control number N.

The control table shown in FIG. 8 corresponds to a case where the reverse button 18 or the continuous reverse button 19 is clicked, in which each of the node numbers has an increment of "−1" except a part of the control number 1, compared with the case of FIG. 6, as the relations between the control numbers and the nodes are as follows:

the node N to the control number 1 the node 1 to the control number 2 the node (X−1) to the control number X the node X to the control number (X+1)

the node (N−1) to the control number N.

Figure 9:
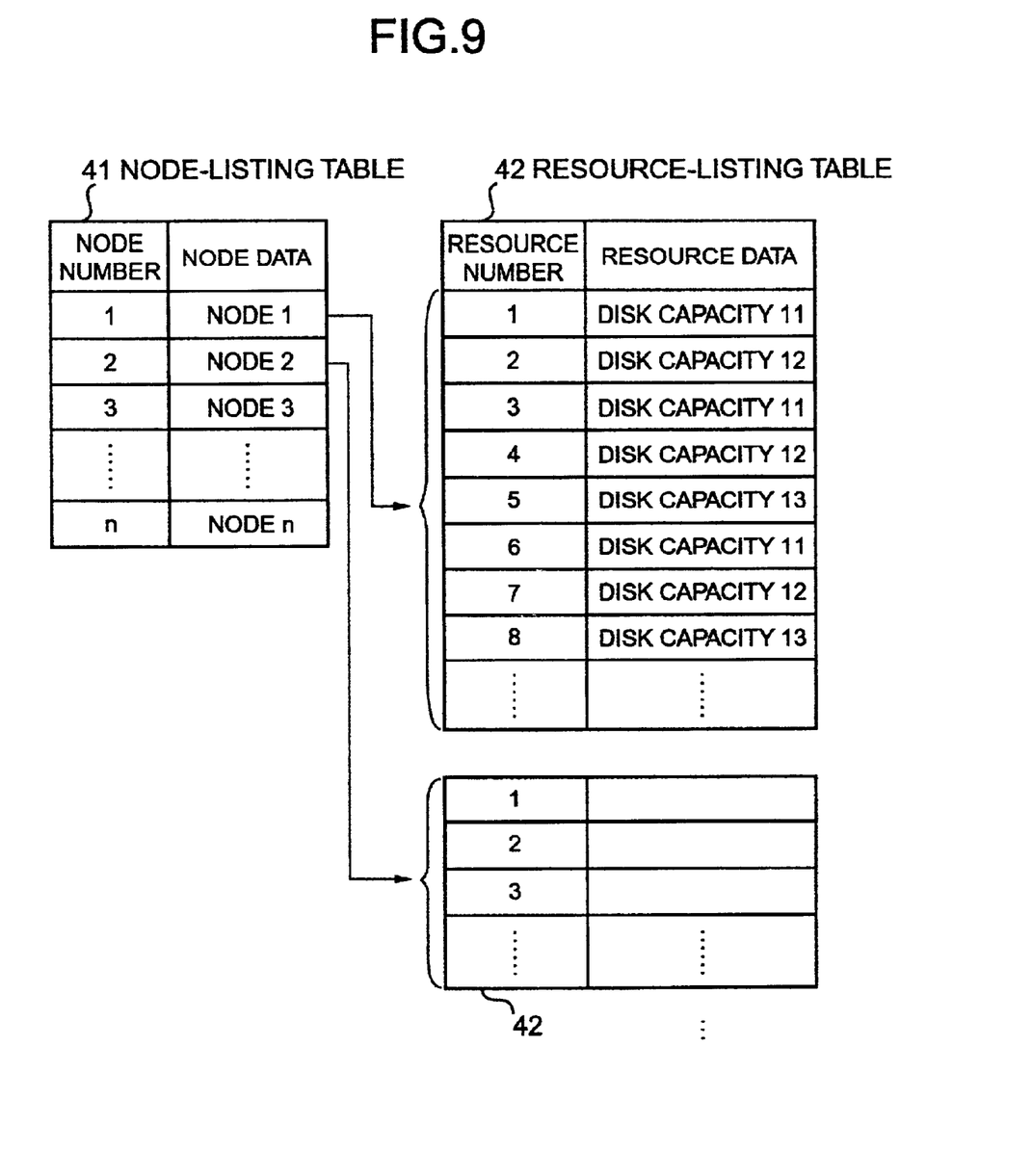
FIG. 9 is an explanatory illustration showing a table for displaying of the present invention.

FIG. 9 shows the table for displaying. A node-listing table 41 retains node data of each of the nodes to be displayed on the screen, and a resource-listing table 42 retains resource data of each of the resources to be displayed on the screen.

Here, when the operating condition of each of the nodes in the cluster system is displayed on the screen, the node-listing table 41 is prepared as the table 33d for displaying shown in FIG. 4, and when the icon of the node 3 on the display screen shown in FIG. 2 is clicked so that the operating condition of the resource is displayed on the screen, the resource-listing table 42 of the said node is prepared as the table 33d. It is noted that data themselves used to make this table are stored in the memory 34 in the form of a hierarchical structure.

Figure 10:
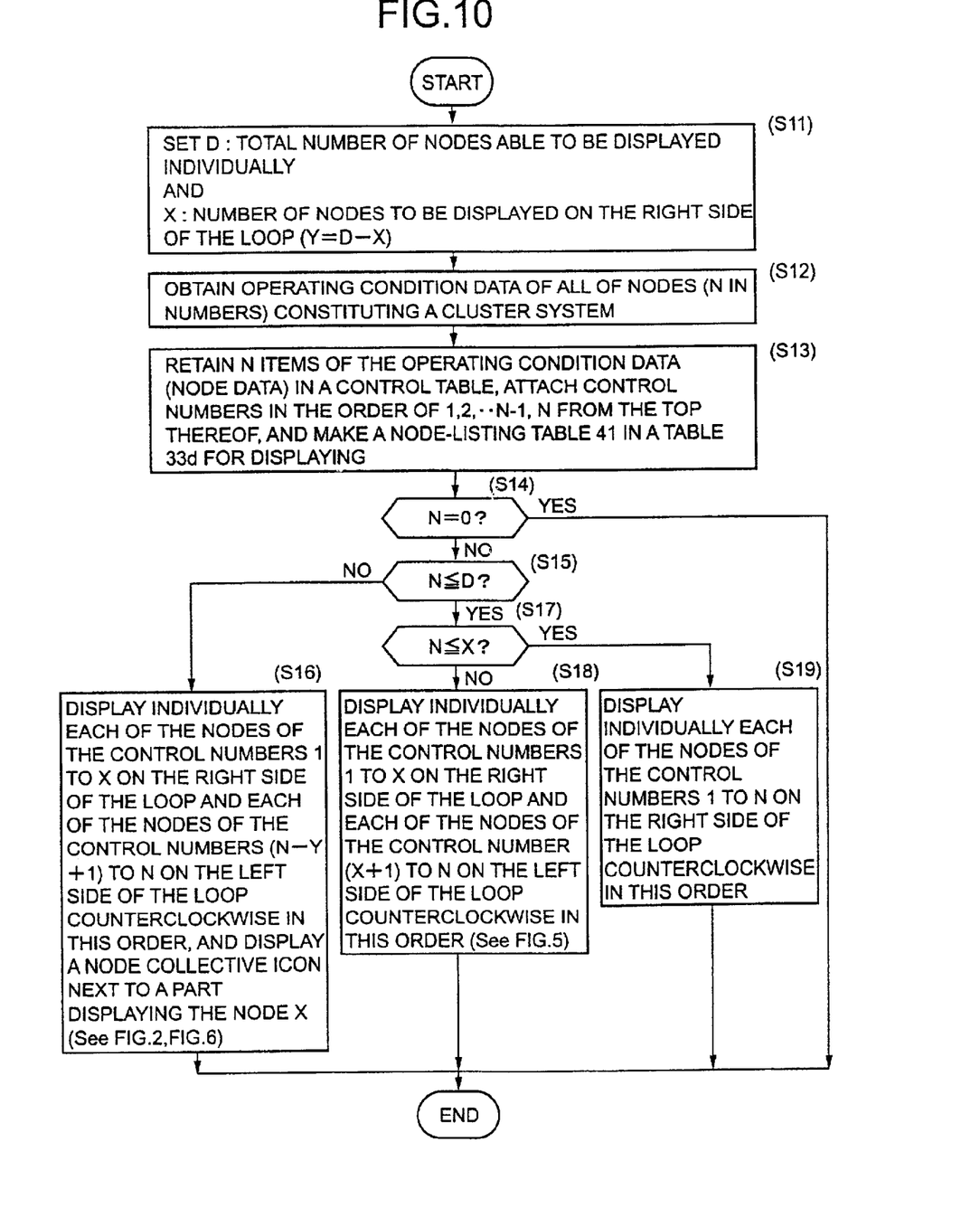
FIG. 10 is an explanatory illustration showing a procedure of displaying a plurality of nodes in the form of a loop of the present invention.
Figure 11:
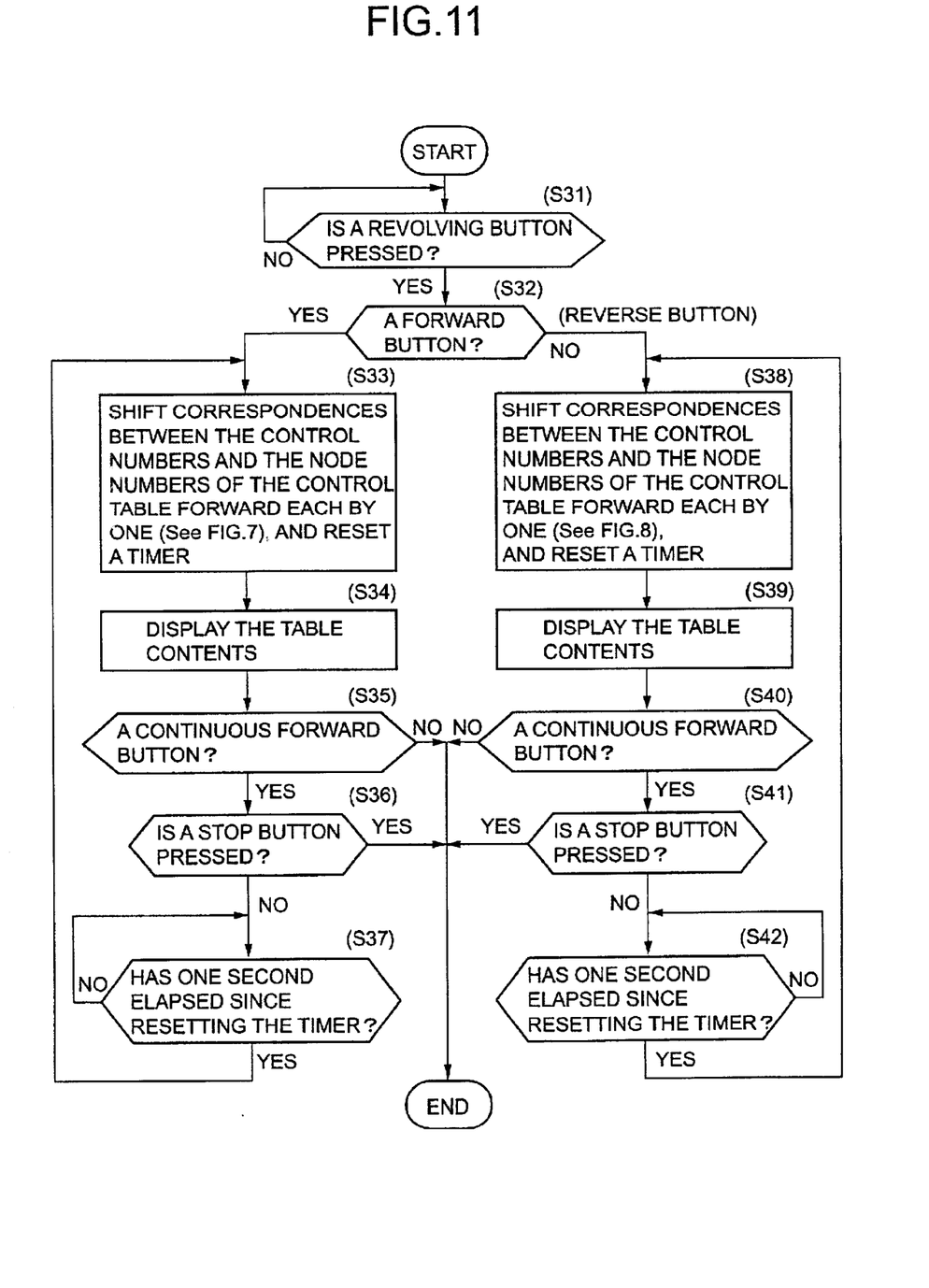
FIG. 11 is an explanatory illustration showing a procedure of a revolving display of a plurality of nodes of the present invention.

FIG. 10 shows a procedure of displaying a plurality of nodes in the form of a loop. Its contents are as follows. It is noted that the subject performing processes shown in FIG. 10 and FIG. 11 is the operation control unit 33a.

In step S11, set the total number D of nodes (a total number of icons) able to be displayed individually on the loop 2 of the screen 1 and the number X of nodes (a number of icons) to be displayed on the right side of the loop 2, and proceed to next step S12. Additionally, also set Y (=D−X).

In step S12, obtain operating condition data (node data and resource data thereof) of each of the N nodes constituting the cluster system, store the data in the memory 34, and proceed to next step S13.

In step S13, retain this operating condition data (node data) in the control table 33c, attach the control numbers in the order of 1, 2, ... N from the top of the table, make the node-listing table 41 in the table 33d for displaying, and proceed to next step S14.

In step S14, judge if "N=0" stands or not, and in a case of "YES" terminate the series of the processes, and in a case of "NO" proceed to next step S15.

In step S15, judge if "N=<D" stands or not, and in a case of "YES" proceed to step S17, and in a case of "NO" proceed to next step S16. Here, "NO" stands in a case of jointly using the node collective icon, as in FIG. 2, because all of the node icons cannot be displayed individually.

In step S16, display individually each of the nodes of the control numbers 1 to X on the right side of the loop 2 of the screen 1 and each of the nodes of the control numbers (N−Y+1) to N on the left side of the loop 2 counterclockwise in this order, and display the node collective icon next to a part displaying the node X (see FIG. 2 and FIG. 6), and terminate the series of the processes.

In step S17, judge if "N=<X" stands or not, and in a case of "YES" proceed to step S19, and in a case of "NO" proceed to next step S18.

In step S18, display individually each of the nodes of the control numbers 1 to X on the right side of the loop 2 of the screen 1 and each of the nodes of the control numbers (X+1) to N on the left side of the loop 2 counterclockwise in this order (see FIG. 5), and terminate the series of the processes.

In step S19, display individually each of the nodes of the control numbers 1 to N on the right side of the loop 2 of the screen 1 counterclockwise in this order, and terminate the series of the processes.

It is noted that, in the process of steps S16, S18 and S19, the operation control unit 33a generates data for displaying icons based on contents of the control table 33c and the table 33d for displaying, and sends this to the frame memory 36a of the display device via the input-output interface 32.

FIG. 11 shows a procedure of a revolving display of a plurality of nodes. Its contents are as follows.

In step S31, judge if the revolving button (each of the buttons 15, 16, 18 and 19) is clicked or not, and in a case of "YES" proceed to next step S32, and in a case of "NO" repeat this judgment.

In step S32, judge if the revolving button being clicked is the forward button (each of the buttons 15 and 16) or not, and in a case of "YES" proceed to next step S33, and in a case of "NO" proceed to step S38.

Figure 7:
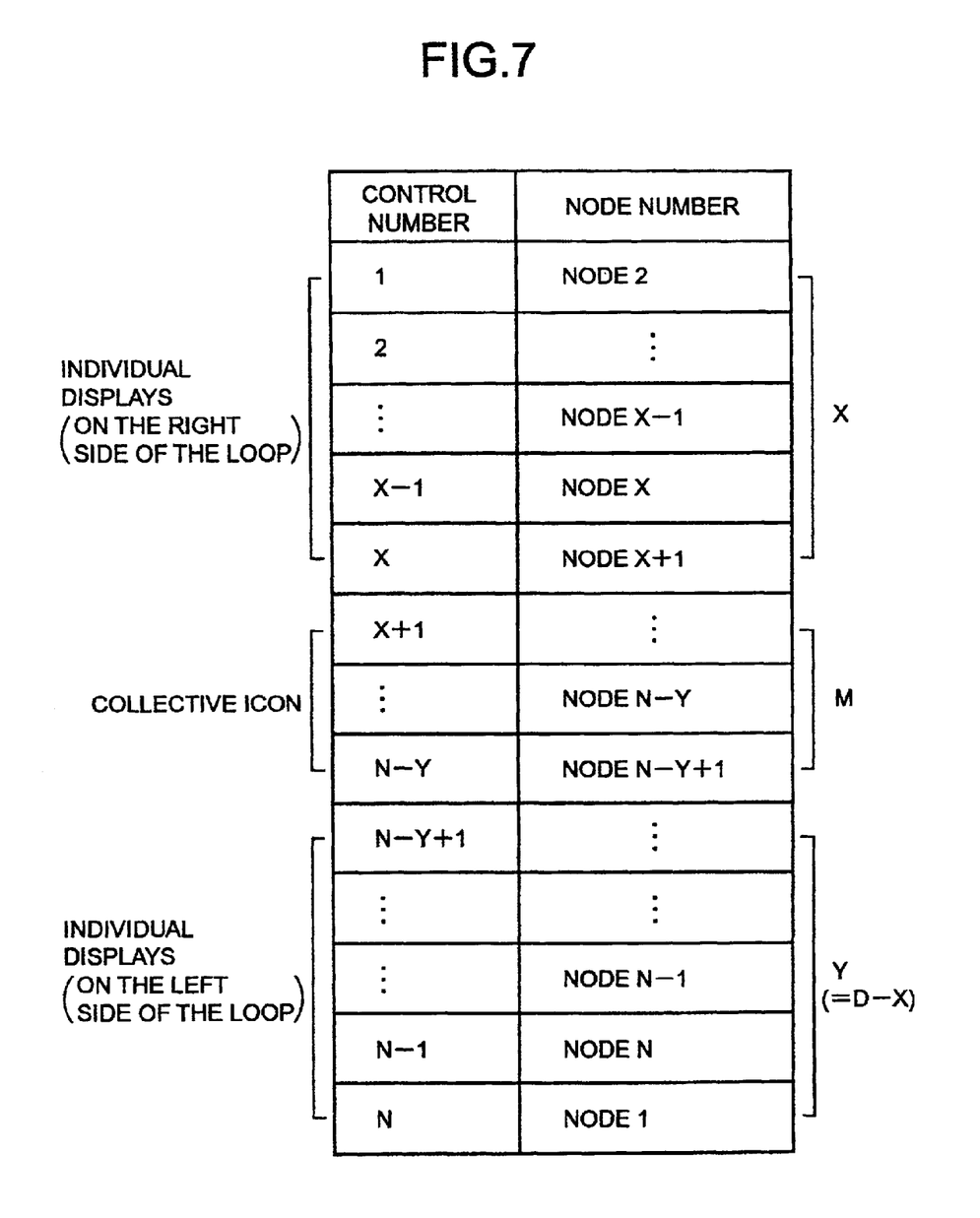
FIG. 7 is an explanatory illustration showing the control table (a forward revolution) of the present invention.

In step S33, shift correspondences between the control numbers and the node numbers of the control table 33c forward each by one, as shown in FIG. 7, and reset the timer 33b, and then proceed to next step S34.

In step S34, display the table contents, i.e., perform the above-mentioned process of step S16 based on the contents of the control table 33c and the table 33d for displaying, and proceed to next step S35.

In step S35, judge if the revolving button being clicked is the continuous forward button 15 or not, and in a case of "YES" proceed to next step S36, and in a case of "NO" terminate the series of the processes.

In step S36, judge if the stop button 17 is clicked or not, and in a case of "YES" terminate the series of the processes, and in a case of "NO" proceed to next step S37.

In step S37, judge if one second has elapsed or not since resetting the timer 33b in the above-mentioned step 533, and in a case of "YES" return to step S33, and in a case of "NO" repeat this judgment.

Figure 8:
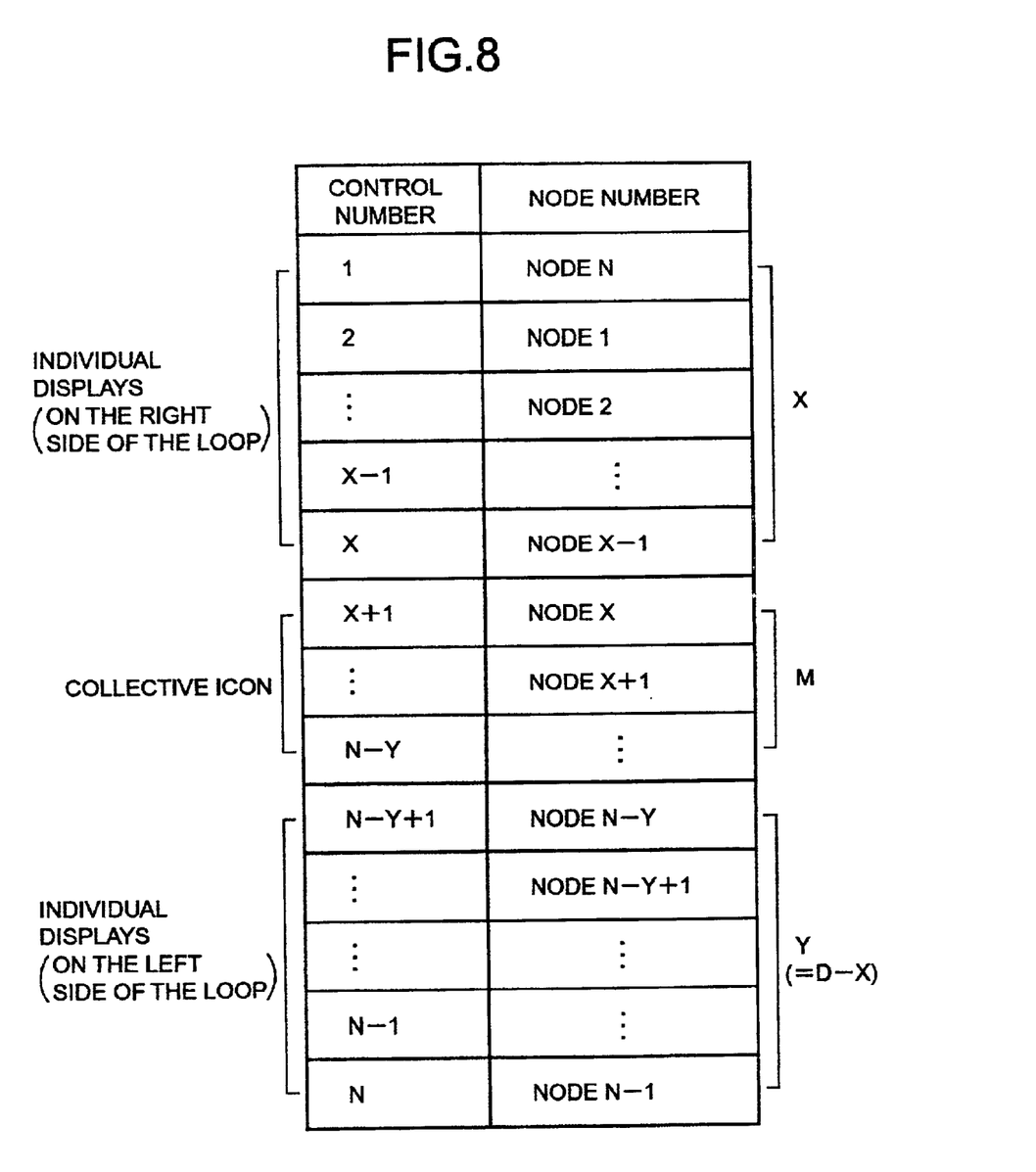
FIG. 8 is an explanatory illustration showing the control table (a reverse revolution) of the present invention.

In step S38, shift correspondences between the control numbers and the node numbers of the control table 33c reversely each by one, as shown in FIG. 8, and reset the timer 33b, and then proceed to the next step.

In step S39, display the table contents, i.e., perform the above-mentioned process of step S16 based on the contents of the control table 33c and the table 33d for displaying, and proceed to the next step.

In step S40, judge if the revolving button being clicked is the continuous reverse button 19 or not, and in a case of "YES" proceed to next step S41, and in a case of "NO" terminate the series of the processes.

In step S41, judge if the stop button 17 is clicked or not, and in a case of "YES" terminate the series of the processes, and in a case of "NO" proceed to next step S42.

In step S42, judge if one second has elapsed or not since resetting the timer 33b in the above-mentioned step S38, and in a case of "YES" return to step S38, and in a case of "NO" repeat this judgment. A value of the elapsed time used in step S37 and the present step is arbitrary.

Additionally, the contents of the control table 33c may be in a form wherein each of node data 1 to node data N is given the control number in the order of 1, 2, . . . N–1, N, i.e., a control table may be created in a form wherein the control table 33c and the table 33d for displaying are combined, so that, when the revolving buttons 15, 16, 18 and 19 are clicked, relations between the control numbers and the node data of this control table are shifted as described above.

Besides, when the node icon in the display screen shown in FIG. 2 is clicked so that the resource condition thereof is displayed on the screen as shown in FIG. 3, the operation control unit 33a creates a control table regarding this resource in the same manner as that in FIG. 5 to FIG. 8, and perform the processes of FIG. 10 and FIG. 11 based on this control table and the resource-listing table 42 shown in FIG. 9.

In addition, it is a matter of course that the present invention is not used only in the case of displaying the operating conditions of each of the nodes in the cluster system, but is applicable to a case of displaying conditions of constituents of each of various systems individually in the form of a loop on the screen.

Figure 12:
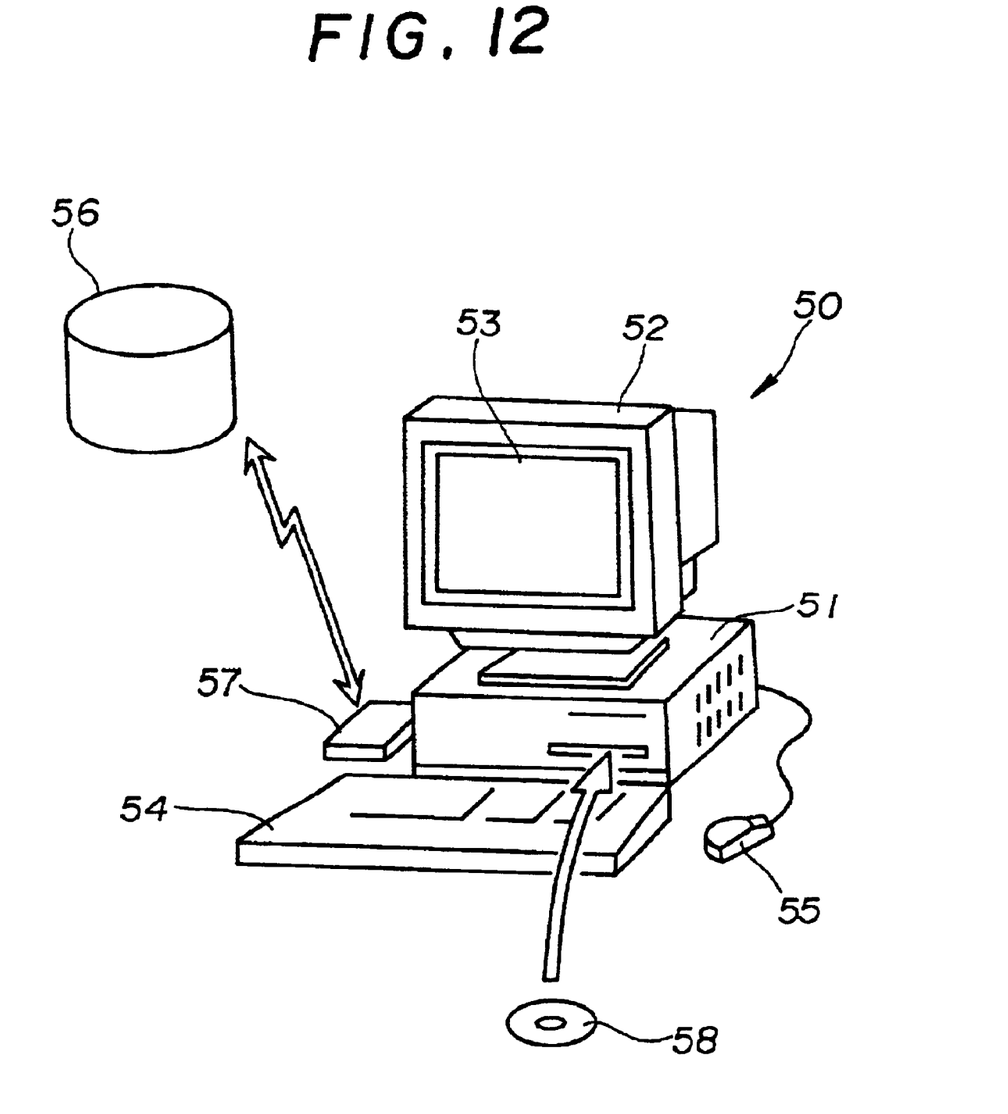
FIG. 12 is an explanatory illustration showing an outline of a computer system reading a program from a computer-readable recording medium and performing the program of the present invention.

Next, a second embodiment of the present invention will be described. FIG. 12 shows an outline of a computer system reading a program from a computer-readable recording medium and performing the program.

A computer system 50 mainly comprises a body unit 51, a display unit 52, a keyboard 54, a mouse 55, and a modem 57. A CPU and a disk-drive device, etc. are incorporated in the body unit 51, and an image is displayed on a display screen 53 of the display unit 52 by instructions from the body unit 51. Various information is input into the computer system 50 by the keyboard 54, and a position on the display screen 53 is specified by the mouse 55. A program is stored in a database 56 on the side of an outside program provider accessing via the modem 57, a portable recording medium 58, such as a CD-ROM and a floppy disk, or in a memory of the body unit 51, etc. The program is loaded into the body unit 51, and is executed on the memory thereof.

INDUSTRIAL APPLICABILITY

As above, since the present invention divides all objects to be displayed of system constituents into an individually displayed group and the remaining collective group not individually displayed and displays both in the form of a loop on a screen, and then, based on an instruction of a revolving display, newly displays individually one, for example, of system constituents corresponding to the collective group, and at the same time puts one, for example, system constituent that has been displayed individually thitherto into the collective group, the present invention can secure an excellent visibility for all of the constituents even under a condition where the number of system constituents exceeds the total number of individual displays.

In addition, since all of the constituents are displayed individually by a revolving manipulation in basically one direction, the manipulation is easy to handle compared with a scrolling manipulation premised on shifting in two directions of an up/down direction and a left/right direction, and thus an highly convenient image display control method can be provided.

What is claimed is:

1. A screen display control method for individually displaying conditions of each of a plurality of constituents of a system, by arranging the plurality of constituents in a form of a loop on a screen, the method comprising:

a first operation of comparing a total number A (A is a positive integer) of objects to be displayed regarding said constituents and a total number B (B is a positive integer) of individual displays on the screen so as to, when A is greater than B, display a collective object which represents that A is greater than B, as one of the objects arranged along with the loop, and at the same time display a part of said objects along the loop; and a second operation of newly displaying a remaining part of said objects to be displayed in accordance with an instruction of a revolving display so that the remaining part of said objects sequentially appears from said collective object, and at the same time shifting said number of said objects that have been displayed previously individually along the loop into said collective object.

2. The screen display control method as claimed in claim 1, wherein said first operation includes the operation of displaying on said collective group information indicating whether an abnormal constituent is present among said constituents other than said objects to be displayed corresponding to B, and at the same time individually displaying information indicating whether each of said constituents of said objects to be displayed corresponding to B is abnormal.

3. The screen display control method as claimed in claim 1, wherein said first operation includes the operation of displaying on said collective group information indicating whether an abnormal resource is present among resources included in said constituents other than said objects to be displayed corresponding to B, and at the same time individually displaying information indicating whether an abnormal resource is present among resources included in said constituents of said objects to be displayed corresponding to B.

4. A screen display control device for individually displaying conditions of each of a plurality of constituents of a system, by arranging the plurality of constituents in a form of a loop on a screen, the device comprising:

an individual display unit comparing a total number A (A is a positive integer) of objects to be displayed regarding said constituents and a total number B (B is a positive integer) of individual displays on the screen so as to, when A is greater than B, display a collective object which represents that A is greater than B, as one of the objects arranged along the loop, and at the same time display a part of a predetermined number of said objects along the loop, the predetermined number being equal to or less than B; and a shifting unit newly displaying a remaining part of said objects to be displayed in accordance with an output signal of a revolving-display instruction device so that the remaining part of said objects sequentially appears from said collective object, and at the same time shifting said number of said objects that have been displayed previously individually along the loop into said collective object.

5. The screen display control device as claimed in claim 4, wherein said individual display unit displays on said collective group information indicating whether an abnormal constituent is present among said constituents other than said objects to be displayed corresponding to B, and at the same time individually displays information indicating whether each of said constituents of said objects to be displayed corresponding to B is abnormal.

6. The screen display control device as claimed in claim 4, wherein said individual display init displays on said collective group information indicating whether an abnormal resource is present among resources included in said constituents other than said objects to be displayed corresponding to B, and at the same time individually displays information indicating whether an abnormal resource is present among resources included in said constituents of said objects to be displayed corresponding to B.

7. A computer-readable recording medium storing a program used for a screen display control for individually displaying conditions of each of a plurality of constituents of a system, by arranging the plurality of constituents in a form of a loop on a screen, wherein said program causes a computer to perform an individual display procedure of comparing a total number A (A is a positive integer) of objects to be displayed regarding said constituents and a total number B (B is a positive integer) of individual displays on the screen so as to, when A is greater than B, display a collective object, which represents that A is greater than B, as one of the objects arranged along the loop, at the same time display a part of a predetermined number of said objects along the loop, the predetermined number being equal to or less than B; and a shifting procedure of newly displaying a remaining part of said objects to be displayed in accordance with an instruction of a revolving display so that the remaining part of said objects sequentially appears from said collective object, and at the same time shifting said number of said objects that have been displayed previously individually along the loop into said collective object.

8. The computer-readable recording medium as claimed in claim 7, wherein said individual display procedure includes the procedure of displaying on said collective group information indicating whether an abnormal constituent is present among said constituents other than said objects to be displayed corresponding to B, and at the same time individually displaying information indicating whether each of said constituents of said objects to be displayed corresponding to B is abnormal.

9. The computer-readable recording medium as claimed in claim 7, wherein said individual display procedure includes the procedure of displaying on said collective group information indicating whether an abnormal resource is present among resources included in said constituents other than said objects to be displayed corresponding to B, and at the same time individually displaying information indicating whether an abnormal resource is present among resources included in said constituents of said objects to be displayed corresponding to B.

* * * * *

UNITED STATES PATENT AND TRADEMARK OFFICE
CERTIFICATE OF CORRECTION

PATENT NO. : 6,850,258 B2
DATED : February 1, 2005
INVENTOR(S) : Fumio Saitoh et al.

It is certified that error appears in the above-identified patent and that said Letters Patent is hereby corrected as shown below:

Title page,
Item [57], ABSTRACT,
Line 12, insert -- , -- after "buttons".

Column 8,
Line 52, insert -- , -- after "object".

Column 9,
Line 26, insert -- , -- after "object".
Line 48, replace "init" with -- unit --.

Column 10,
Line 18, insert -- and -- after "loop".

Signed and Sealed this

Sixth Day of September, 2005

JON W. DUDAS
*Director of the United States Patent and Trademark Office*